US007505929B2

(12) United States Patent
Angert et al.

(10) Patent No.: US 7,505,929 B2
(45) Date of Patent: Mar. 17, 2009

(54) METHOD, SYSTEM AND COMPUTER PRODUCT FOR AUCTION OF DELIVERABLE PREPARED FOOD VIA THE INTERNET

(76) Inventors: Charles D. Angert, 7057 Swan Rd., Colorado Springs, CO (US) 80908; Andrew Mitchell Harris, 828 Mountain Stream La., Lakemont, GA (US) 30552

( * ) Notice: Subject to any disclaimer, the term of this patent is extended or adjusted under 35 U.S.C. 154(b) by 844 days.

(21) Appl. No.: 10/857,831

(22) Filed: Jun. 1, 2004

(65) Prior Publication Data
US 2006/0010037 A1      Jan. 12, 2006

(51) Int. Cl.
G06Q 30/00    (2006.01)
G06Q 50/00    (2006.01)
(52) U.S. Cl. .............................. 705/26; 705/15; 705/27; 705/28
(58) Field of Classification Search .................. 705/15, 705/26
See application file for complete search history.

(56) References Cited

U.S. PATENT DOCUMENTS

| | | | |
|---|---|---|---|
| 4,674,044 A | 6/1987 | Kalmus et al. | |
| 5,758,328 A | 5/1998 | Giovannoli | |
| 5,870,716 A | 2/1999 | Sugiyama et al. | |
| 5,960,407 A | 9/1999 | Vivona | |
| 6,012,045 A * | 1/2000 | Barzilai et al. | 705/37 |
| 6,272,474 B1 | 8/2001 | Garcia | |
| 6,278,982 B1 | 8/2001 | Korhammer et al. | |
| 6,282,521 B1 | 8/2001 | Howorka | |
| 6,415,270 B1 | 7/2002 | Rackson et al. | |
| 6,549,904 B1 | 4/2003 | Ortega et al. | |
| 6,741,969 B1 * | 5/2004 | Chen et al. | 705/14 |
| 7,212,975 B2 * | 5/2007 | Bantz et al. | 705/1 |
| 2001/0056396 A1 * | 12/2001 | Goino | 705/37 |
| 2002/0002524 A1 * | 1/2002 | Kossovsky et al. | 705/36 |
| 2002/0099643 A1 * | 7/2002 | Abeshouse et al. | 705/37 |

(Continued)

FOREIGN PATENT DOCUMENTS

DE          29606255 U1 *  8/1996
WO    WO 2004097550 A2 * 11/2004

OTHER PUBLICATIONS

Laura Meade Kirk, Buying food on line—You can't squeeze the produce, but you might save time, Jun. 4, 2000, The Providence Journal, Providence, R.I., p. L.07.*

*Primary Examiner*—Matthew S Gart
*Assistant Examiner*—Scott A Zare
(74) *Attorney, Agent, or Firm*—Mitch Harris, Atty at Law, LLC

(57) ABSTRACT

A method and system for auctioning or sales of deliverable prepared food via the Internet permit customers to purchase or bid on prepared food items. A food preparation and delivery portion of the system includes a delivery vehicle, which may have a mobile kitchen for the preparation of food items en-route. The location of the delivery vehicle is determined from a global positioning system (GPS) receiver in the vehicle or via another location-finding mechanism. Food items with an estimated time of arrival (ETA) is displayed on a web page that provides an interface for purchase or bidding. Bidding may be made for the actual food item purchase or for a scheduled delivery time. Items may be re-auctioned, causing the delivery of a food item to be transferred to another bidder. Audio and/or visual communication with an ordering point and/or delivery vehicle may be provided in the user interface.

22 Claims, 9 Drawing Sheets

U.S. PATENT DOCUMENTS

| | | | |
|---|---|---|---|
| 2002/0188492 A1* | 12/2002 | Borton | 705/8 |
| 2003/0041015 A1* | 2/2003 | Gutta | 705/37 |
| 2005/0060164 A1* | 3/2005 | Eli Berl Illion | 705/1 |
| 2005/0273345 A1* | 12/2005 | Castillejo Romero | 705/1 |

* cited by examiner

METHOD, SYSTEM AND COMPUTER PRODUCT FOR AUCTION OF DELIVERABLE PREPARED FOOD VIA THE INTERNET

BACKGROUND OF THE INVENTION

1. Field of the Invention

The present invention relates generally to food delivery systems, and more specifically, to a method and system for auctioning and/or scheduling delivery of prepared food remotely over a network.

2. Background of the Invention

Present-day culture is fascinated with the novelty and immediacy provided by state-of-the art data communications channels such as the Internet. Now that individuals have access to information and sales services at the click of a mouse, purchase of books, music, electronics items and other goods and services are available from the comfort of the couch. However, immediate needs of Internet users are not typically met by these systems, as traditional delivery services are typically used, introducing days or weeks of delay. Therefore, traditional Internet delivery methods are unsuitable for the delivery of prepared food, for which delay times of less than an hour are generally necessary.

Systems have been employed for the sale of groceries where delivery is somewhat more immediate, but deliveries are typically scheduled as a delivery vehicle and stock-pull person becomes available to service the need. Such systems are insufficient to fill the immediate feeding needs of the typical Internet user.

Auction-based Internet sites are especially popular in present culture, as they add an element of competition and chance to what would otherwise be an ordinary sales transaction. Food items are typically not sold at auction. Exceptions are auctions such as fund-raisers and charity events where an event such as a church bake sale is transformed into an auction where the spirit is more donative rather than competitive. Other auction items might include custom-prepared meals by expert gourmet chefs, but in general, prepared food is not auctioned, due to its perishable and location-specific nature.

Information about delivery and availability status of items for sale or auction via the Internet is typically limited to whether or not an item is in-stock and once an item has shipped, the tracking status of the items' delivery status, generally in terms of tracking points of a common carrier delivery service such as the United States Postal Service, United Parcel Service, Federal Express and the like.

Therefore, it would be desirable to provide a method and system for auctioning, delivering and modifying sales and delivery of prepared food items. It would further be desirable to provide a user interface for enhancing the purchase/auction experience via a visual display that provides availability, competitive and progress tracking elements. I would also be desirable to provide a business method whereby auction paradigms may be applied to the sales of prepared food items.

SUMMARY OF THE INVENTION

The above objectives of auctioning, delivering and modifying sales or delivery of prepared food items are achieved in a method and system for auctioning, delivering and modifying sales of prepared food items that include both business method and implementation methodology components. A customer user interface is also provided for enhancing the auction/delivery progress experience, as well as to reveal available options for decision-making by an Internet user.

The system provides an Internet site serving a customer interface having a list of prepared food items available for delivery within a short time interval and estimated delivery times generated in conformity with a predetermined locale associated with a customer. Additionally, map tracking information of a selected item's prospective delivery status and/or location may be provided for viewing by one or more users. A sales and/or auction activating control is provided for selection of a prepared food item by the customer. Upon selection of a prepared food item by the user, delivery is scheduled, unless the purchase method is an auction and the customer is not the initial high bidder. Periodic display is made of estimated arrival time and optionally a map showing the progress and route of a delivery vehicle assigned to deliver the selected prepared food item. Food may be prepared at a fixed location, or prepared en-route with order information communicated directly to the delivery vehicle.

In an auction, delivery may be interrupted en-route if the auction method provides for re-auction facilities. A re-auction may be employed as a renegotiating process that the customer has previously agreed to, whereby a sale of the prepared food item is usurped by another user via the Internet. Alternatively, an auction may be held open until the prepared food item is delivered to a particular bidder. For an auction, the customer interface may show prepared food items that are en-route to other users, so that a user may enter into bidding competition for the en-route items. The re-auction period is held open for a time period established by a timer and the timer may be set at each bid by determining slack time in the preparation/delivery schedule for the item to the current winning bidder or the bidding may be held open until actual delivery or expiration of the shelf life of the food item. Bid increments for a next bidder may be set in conformity with a level of burden associated with re-routing the food item.

The prepared food item sales and auction described above include associated sales that include prepared food items, such as airplane or other transportation tickets, but only as provided in a locale for immediate delivery, such as in an aircraft or at an airline terminal.

Additionally, the sales prices of food may be adjusted in conformity with the auction process. If a user has purchased an item that is usurped in a re-auction process, the vendor may make an identical or similar item available at a reduced price and later delivery. Alternatively, the vendor may provide an item identical or similar to an item on which an auction is lost or usurped available at a higher price and possibly earlier delivery. Alternatively, a vendor may conduct bidding on delivery time for items for sale and/or items already sold. For example, while a set of food items may already be sold and scheduled for delivery, the vendor may conduct bidding for location in the delivery queue. For example, a vendor may have multiple orders sold and scheduled for delivery by a single vehicle and an on-line competition (i.e., bidding war) may be conducted for position of various customers in the delivery queue. As an alternative to an auction, a vendor may simply offer an improved delivery time at a higher cost, or an non-endured or long delivery time a lowered cost.

The methods of business employed in conjunction with the system includes franchising the tracking, various information and server equipment and/or endorsement provided by the delivery service equipment and Internet companies to food service establishments. The delivery systems may be individual vehicles associated with and possibly owned by a particular food service franchise, or may be a vehicle owned by a delivery service or other organization that delivers and/or prepares food from multiple food vendors under a franchise or other agreement with each food vendor. Advertising may be provided on the vehicle directed toward a specific food vendor and its trade indicia, or indicia of each of multiple vendors may be displayed.

The system providing functionality for the above-described methods includes an Internet server that serves the graphical user interface used by the various customer-users to bid on or purchase food items. Tracking of the delivery vehicle is provided by a global positioning (GPS) receiver mounted on each of the delivery vehicles or another location-finding system capable of tracking the vehicles in real-time or quasi-real-time. The vehicle includes communication apparatus which may be a wireless local area network connection (WLAN), cellular telephone or radio link by which the location information is communicated back to the Internet server so that estimated time-of-arrival (ETA) may be related to the users via time and/or map display. The communication link also receives routing and change of routing information from the server so that the delivery schedule may be updated in real-time and the vehicle may be re-routed in conformity with a result of a sales or bidding process. Further equipment within the vehicle may include capability and inventory information systems for automatically determining the availability of food items and relaying information back to the server via the communication link so that available items may be displayed for purchase or auction and so that supply points may be notified of vehicle needs. The vehicle also may include camera equipment so that an image of the food preparation or delivery process may be delivered to one or more of the Internet users. For example, a user may be able to view the preparation of an ordered food item or have an audio-visual communication with or from a driver or other worker in a delivery/preparation vehicle or may view a view of the outside of the vehicle so that progress through city streets, etc. may be tracked, which may also aid in navigation for the vehicle driver should communication with a user be enabled via the Internet.

Supply points are re-stocking centers, which may be fixed food preparation establishments (such as a franchise outlet serving the public) or just raw material depots in systems where all preparation is performed within the delivery vehicle. Supply point communication is provided via wireless or wired network connection to the Internet server or may provide the physical location of the network server. Displays generated from user activity provide order information for food items auctioned or sold. For food items prepared or partially prepared at the supply points, the order/auction information is used to queue food items in the preparation process and schedule pick-up by a delivery vehicle. For food items prepared wholly within the delivery vehicle, the information is used for readying raw materials for a re-stock when the delivery vehicle returns to the supply point.

Equipment at the user site is generally a user-supplied general-purpose computer system executing an Internet browser program for displaying web pages provided by the Internet server. The user site equipment may optionally include cameras and voice-over-Internet equipment for providing verbal and visual communication with the delivery vehicle and/or supply points. The web page user interface may even include a simulation of a fast-food franchise intercom and marquee with associated audio channel quality simulation program processing any audio transferred between the users and the vehicle and/or supply point. Graphic indicia may be used on the web page (including the appearance of an intercom and marquee) for identification of franchisors of various food items available for delivery.

The foregoing and other objectives, features, and advantages of the invention will be apparent from the following, more particular, description of the preferred embodiment of the invention, as illustrated in the accompanying drawings.

DETAILED DESCRIPTION OF THE PREFERRED EMBODIMENTS

Figure 1:
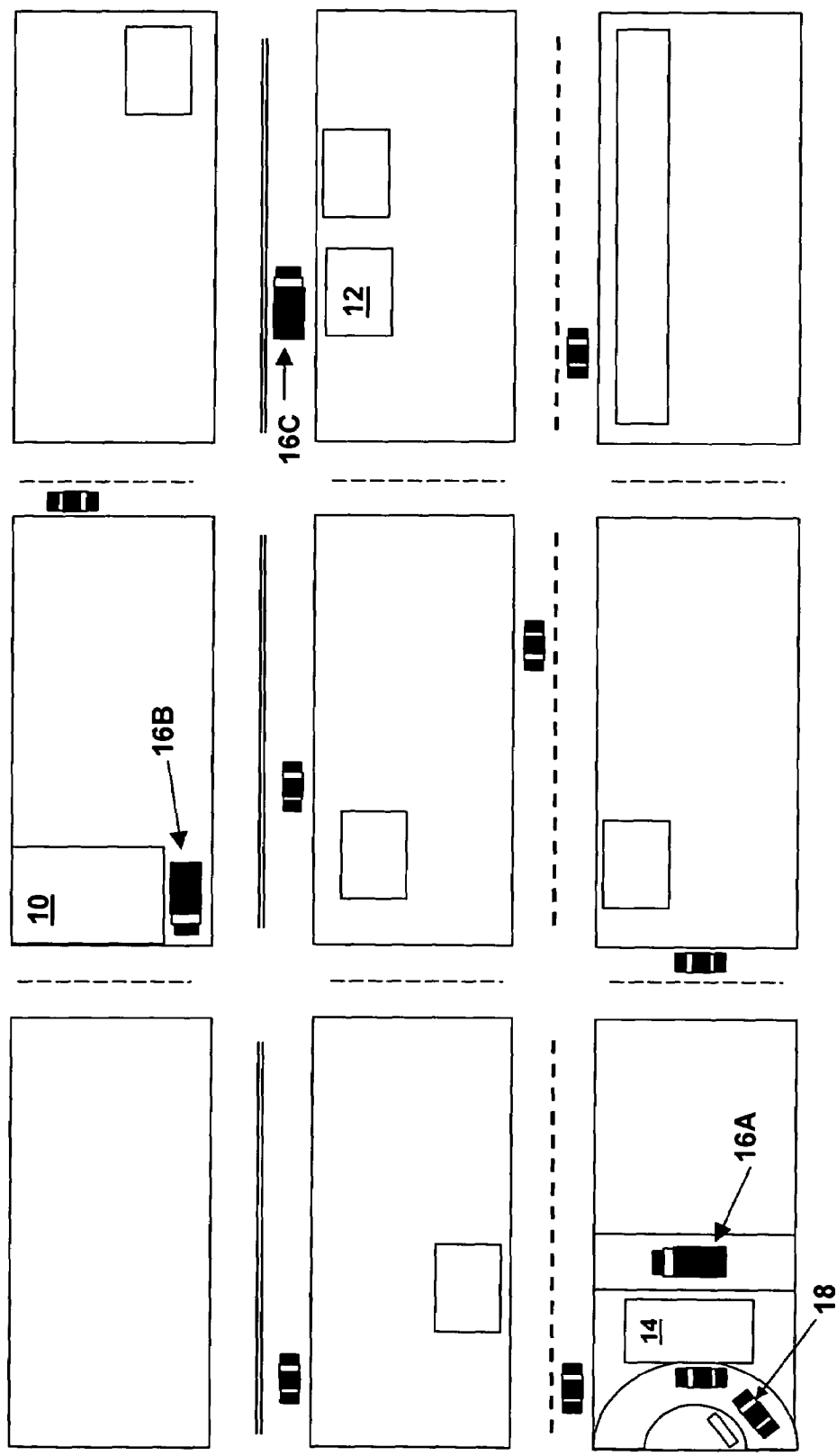
FIG. 1 is a pictorial drawing depicting a system in accordance with an embodiment of the invention as deployed in an urban area.

Referring now to the figures and in particular to FIG. 1, a food sales, delivery and auctioning system deployed in an urban area in accordance with an embodiment of the present invention is shown. FIG. 1 depicts an urban "grid" having blocks of buildings segmented via streets on which vehicles forming part of the system of the present invention are in transit. Various locations of specific importance to the illustration are located at various sites in the figure. In particular, a fast food retail establishment 14 is depicted serving fast-food customers 18 and in the present invention, also servicing a delivery vehicle 16A that pick up prepared food and/or food preparation supplies from fast food retail establishment 14. The system of the present invention encompasses mechanisms and methodologies for selling and/or auctioning prepared food items, and then delivering them within a scheduled period. Delivery vehicle 16C is shown making a delivery to a residence or workplace 12. The delivery may be made of items prepared at a retail location such as fast food retail establishment 14, or may be prepared within delivery vehicle 16C while it is on-route to scheduled deliveries.

Additionally, a supply depot 10 is provided for restocking delivery vehicles 16A-16C as an alternative to, or in concert with fast food retail establishment 14. Supply depot 10 may also serve as a supply source for fast food retail establishment 14 and delivery vehicles 16A-C may also be used to deliver supplies from supply depot 10 to fast food retail establishment 14, providing potential improved efficiency in the operation of the overall system. While the illustration shows food preparation either within one of delivery vehicles 16A-C or within fast food retail establishment 14, a fixed food preparation site may also be used that does not sell fast food to the public directly.

Each of the sites mentioned above as well each delivery vehicle 16A-C includes at least one "client" networked computer system or networked portable appliance. The network interconnect may include both wired and wireless standard network connections, as well as proprietary radio networking connections to maintain contact with vehicles. For example, the customer may be using a personal digital assistant (PDA) or wireless telephone with an Internet interface to order food while at a place other than the customer's residence or office. The wireless device may include a GPS receiver or may receive location information from the wireless network and relay the position information obtained thereby to the system of the present invention in order to provide a delivery location.

The four types of users with which the system communicates are customers, suppliers, drivers and supervisors. There are four corresponding "clients" connected to a server that provide interaction between the system and the corresponding user, providing client-server interaction to support sales and/or auction, preparation and delivery of a prepared food item. However, it is not necessary that the present invention use a network having traditional client-server architecture, as a distributed server network or other alternative may be employed as economies of scale and the particular implementation dictate.

Customers are members of the public who have accessed the networked computer system to purchase or bid on food items and drivers are responsible for delivery of the food items. Supervisors are responsible for scheduling of deliveries, ordering and inventory of supplies and re-stocking the various locations with those supplies. The supervisors may largely replaced with an automatic process that maintains inventories and schedules ordering and delivery of supplies, or a higher level of human involvement may be employed, as needed. Suppliers are responsible for food preparation, and therefore may be a dedicated preparation location, fast food retail establishment 14, or preparation personnel within one of delivery vehicles 16A-C.

The system of the present invention provides a highly flexible system that can respond to changing demand. Delivery vehicles (generally with the supplier included within the vehicles) may be deployed near events where high demand is expected, or the deployment of delivery vehicles may be made at any time based on the observed geographic patterns of deliveries made by the system. In general, the system will naturally adapt to geographic concentrations of demand as a function of normal routing for deliveries, but algorithms that observe and balance demand may additionally be employed to move idle or underutilized delivery vehicles to locales determined by the system.

Figure 2:
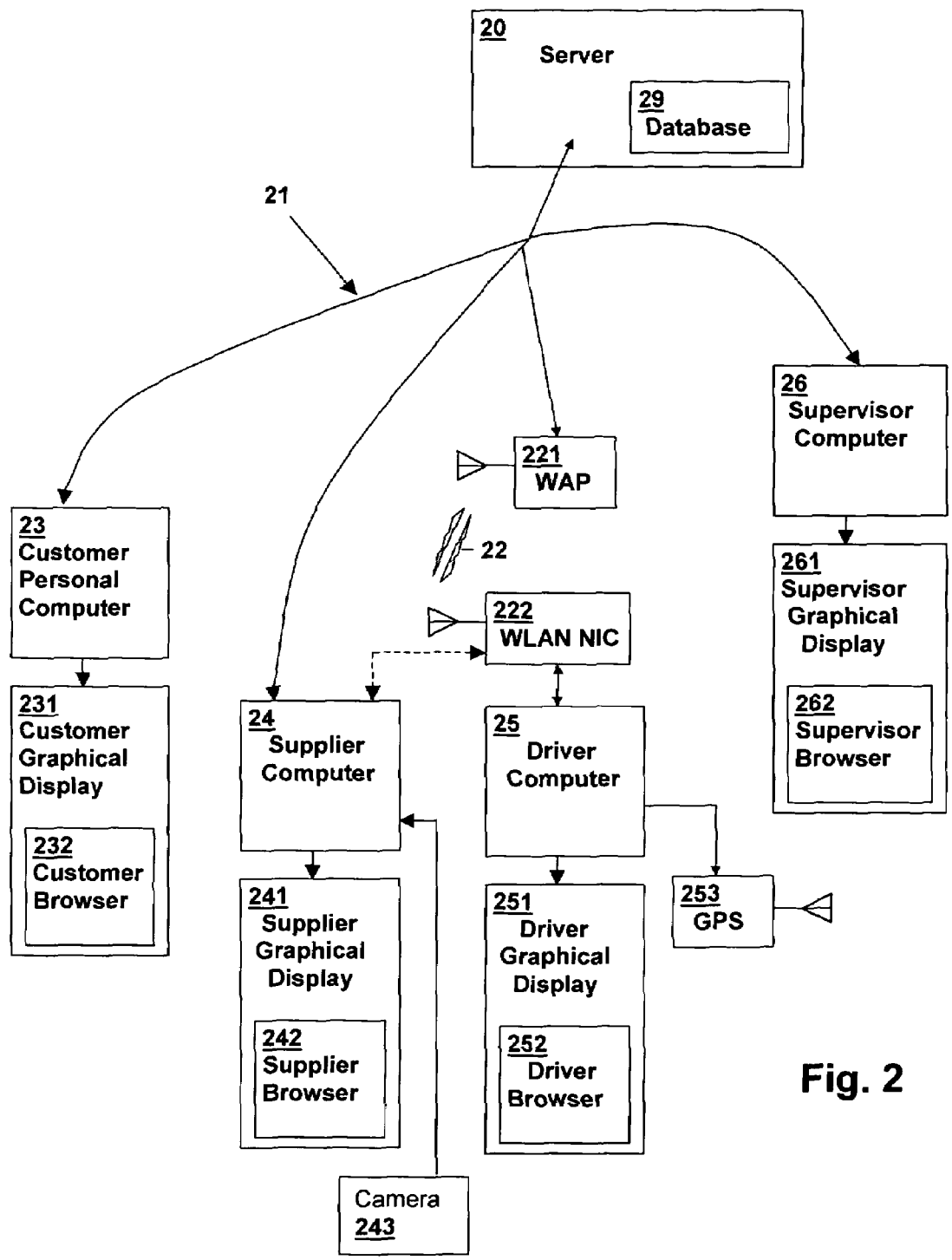
FIG. 2 is a block diagram depicting a networked computer system in which an embodiment of the invention is practiced.

FIG. 2 depicts a networked computer system in which a server 20 communicates via a network connection 21 and/or a wireless network connection 22 each of the above-described clients, each of which accesses server 20 using a computer system operating a browser program, a terminal for providing a special-purpose interface or via a portable device having a user interface. In general, the present invention may be implemented using any number of servers in communication so that the necessary interactions between users are supported (via the above-mentioned clients) to provide sales and/or auction of deliverable prepared food items. Specifically, it is desirable to provide a user interface to customers via a general-purpose computing system executing an Internet browser such as those that are presently in widespread use in homes and offices. Other emerging networks such as dedicated interactive cable systems and dedicated wireless networks may be used as an alternative to the Internet.

Interfaces for other users are desirably tailored to the users' environments. For example, within delivery/preparation vehicles 16A-16C, a driver may use a palm-held or dashboard-installed device as driver computer 25 networked via a wireless local area network (WLAN) network interface (NIC) 222, while food preparation personnel (suppliers) may interact with server 20 via a larger dedicated terminal and a control pad designed to withstand a food preparation environment serving as a mobile version of supplier computer 24 and may share a connection through NIC 222 or have a separate interface for connection with a WLAN access point 221 connected to server 20. A camera 243 may be connected to supplier computer 24 to provide streaming video or still images to customers, supervisors or drivers of the food preparation process. Driver computer 25 also includes an attachment to a global positioning system (GPS) receiver 253 so that location of delivery vehicles 16A-16C may be tracked. Driver computer 25 may also include a camera in or outside of the vehicle so that customers or prospective customers may view the locale around the vehicle.

Supervisors and suppliers in fixed locations such as fast food retail establishment 14 use a supervisor computer system 26 and supplier computer system 24 that may be either general-purpose computing systems in an office-type are environment, or if they located at a food service counter in a franchise establishment, a dedicated terminal system may be more appropriate and may be combined or alternate functions with a point-of-sale system as generally provided in food service establishments.

Each of the above-described clients is provided access to a unique set of web pages or user-interface screens in order for them to interact with server 20. Access to server 20 is determined and managed by a username/security-password system where each client must log-in to a client account that has pre-assigned access privileges depending on the type of client, as well as specific client's stored preference information. Alternatively, log-in may be secured via security objects installed within each of the above-described client computers 24-26. Each of client computers 24-26 includes a graphical display 231, 241, 251 and 261 that displays an interface of a browser 232, 242, 252 and 262 executing on the associated client computer 24-26.

Server 20 maintains and manages a database 29 that stores information about food items, supplies and client computers 23-26. The food item database portion stores information about food items such as: descriptions of food items, standard preparation times, preparation locations (including location and scheduled route of vehicle if suppliers are located therein), prices at locations, stocking information, daily availability, and the longevity of prepared food item.

Database 29 also contains client information such as the type of client, name and location and phone number, distances from any supplier locations, estimated driving times between locations, client preferences, and a history of client activity. For driver clients 25, the database also stores current locations and destinations, GPS information reported by GPS receiver 253, destination lists, driver routing information, order delivery information and estimated arrival times. For supplier clients 24, the database also stores supply order/inventory information, food item order information, driver routing and end customer information.

Figure 3:
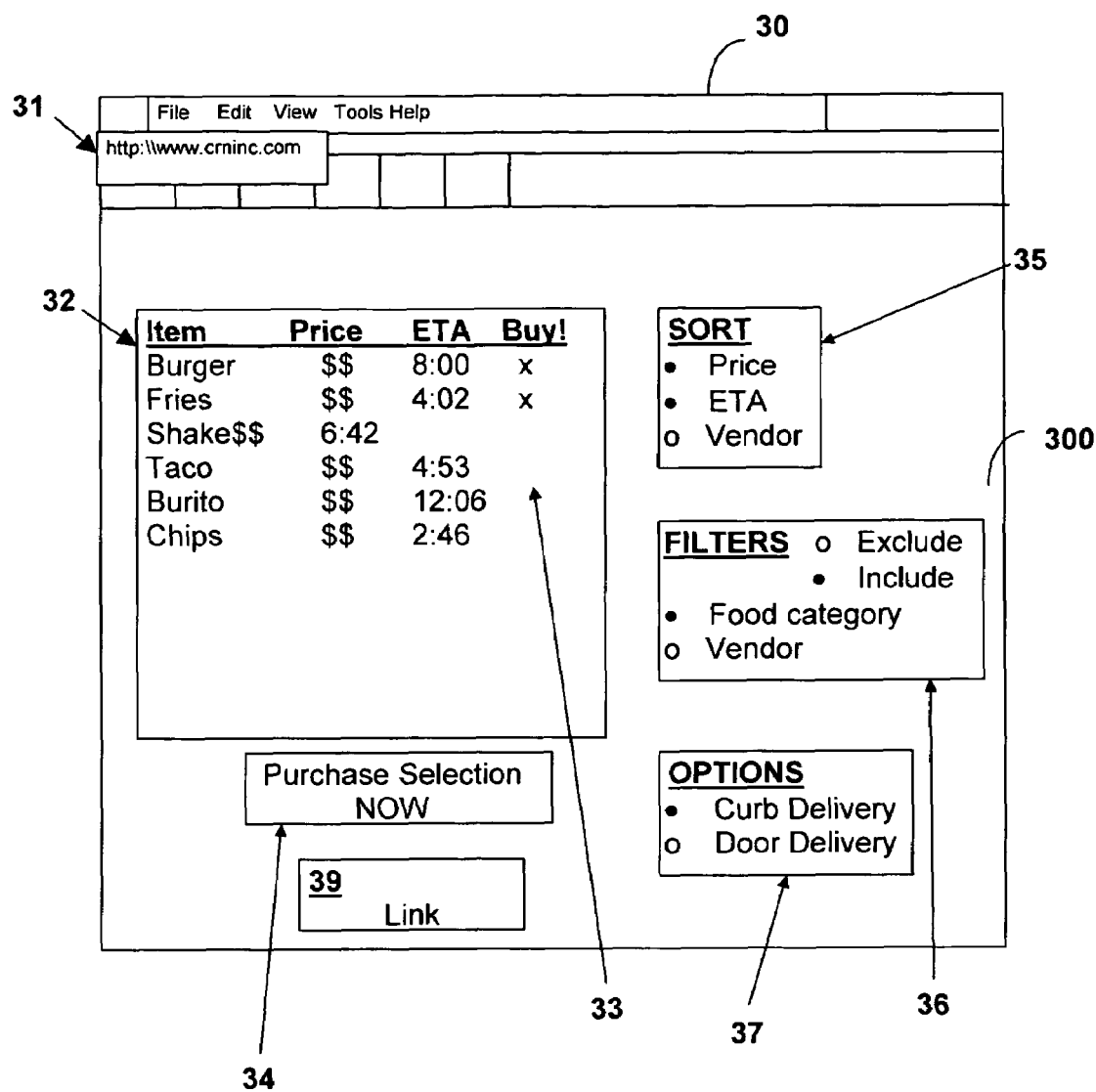
FIG. 3 is a pictorial drawing depicting an Internet browser output displayed on the customer graphic display of FIG. 2, as provided by a networked sales and delivery system in accordance with an embodiment of the invention.

FIG. 3 shows a diagram depicting browser 232 output 30 as displayed on customer graphic display 231 of FIG. 2, in accordance with an embodiment of the invention. Browser 232 may be an Internet browser of a type generally in use, such as Navigator (manufactured by Netscape, Inc.) or Internet Explorer (manufactured by Microsoft Corporation). A location bar 31 permits the user of the browser to direct the browser to interact with a web page (www.crninc.com in this example).

Browser output 30 depicts the graphical and textual content of a customer web page 300, which may contain supplemental content such as advertising link icons 39, as well as items associated directly with operation of the present invention. In the exemplary browser output, all of the operational items associated with the example are depicted as being located within one web page, but multiple pages may be used to separate the various steps associated with a sale or auction. When a customer points location bar 31 of Browser 30 at a customer interface web address of server 20, the depicted interface is delivered from server 20.

Server 20 uses the customer's geographic location to calculate estimated delivery times. The geographic location is entered during customer configuration (or in the case of a mobile wireless device, determined from a location system or embedded GPS receiver), and may be retrieved from database 29 upon login or may be stored locally on customer computer 22 as a cookie or other data source. A new customer will be prompted to provide this information, and previous customers may log-in using previously assigned name and password. Server 20 then displays a dynamic on-line food menu 32 with which the customer may interact. On-line food menu 32 displays a list of available food items from participating vendors, along with an estimated time for delivery of each food item and a price for that item. The price may be tied to the ETA or delivery route so that the costs of delivery to distant locations is reflected in the price. The customer may sort the information presented by selectively choosing sort preferences 35 or by applying food category filters 36. The customer may display an on-line food menu 32 in order by price, or by delivery time. The customer may also choose to filter the displayed selections whereby only a specific food type or category is included or omitted from the browser display.

Web page 300 is updated from Server 20 upon receiving Customer's interactive preferences, as well as dynamically changing information about food item availability and estimated time for delivery. The Customer may choose one or more items from the on-line food menu purchase column 33 for purchase and delivery. The Customer WEB page 300 allows the Customer to choose items from the on-line food menu, then purchase those items. The customer may also be offered delivery options where available. In some areas, the customer may choose curb-side delivery at one price and to-door delivery at another price, selected by option controls 37.

Once a purchase selection button 34 is pressed by the customer, server 20 provides a payment web page, with customer options and information boxes for payment type, account numbers and other necessary information. When an order is confirmed (including an optional check for prior bad delivery points), server 20 will modify information in database 29 to reflect the order, including the creation of an order number, and generate an update to the web pages that may be being communicated and viewed by driver, supplier and supervisor type clients and causes automatic queuing of requests to the driver and supplier computer systems 24 and 25. In general, server 20 will either communicate the request to supervisor computer 26, at which the supervisor will either manually or supervisor computer will automatically schedule and assign a particular driver/supplier combination and add the preparation request to supplier computer system 24 and the delivery request to driver computer system 25, scheduling the preparation and deliver of the ordered food item(s) in queues maintained for the supplier and deliverer.

The scheduling of the two events: preparation and delivery is preferably a sophisticated process that takes into account routing efficiencies for deliveries, variable preparation times of food items, potential as-prepared shelf life of food items, payment incentives for faster delivery when offered, including the delivery type option selected by the customer.

Figure 4:
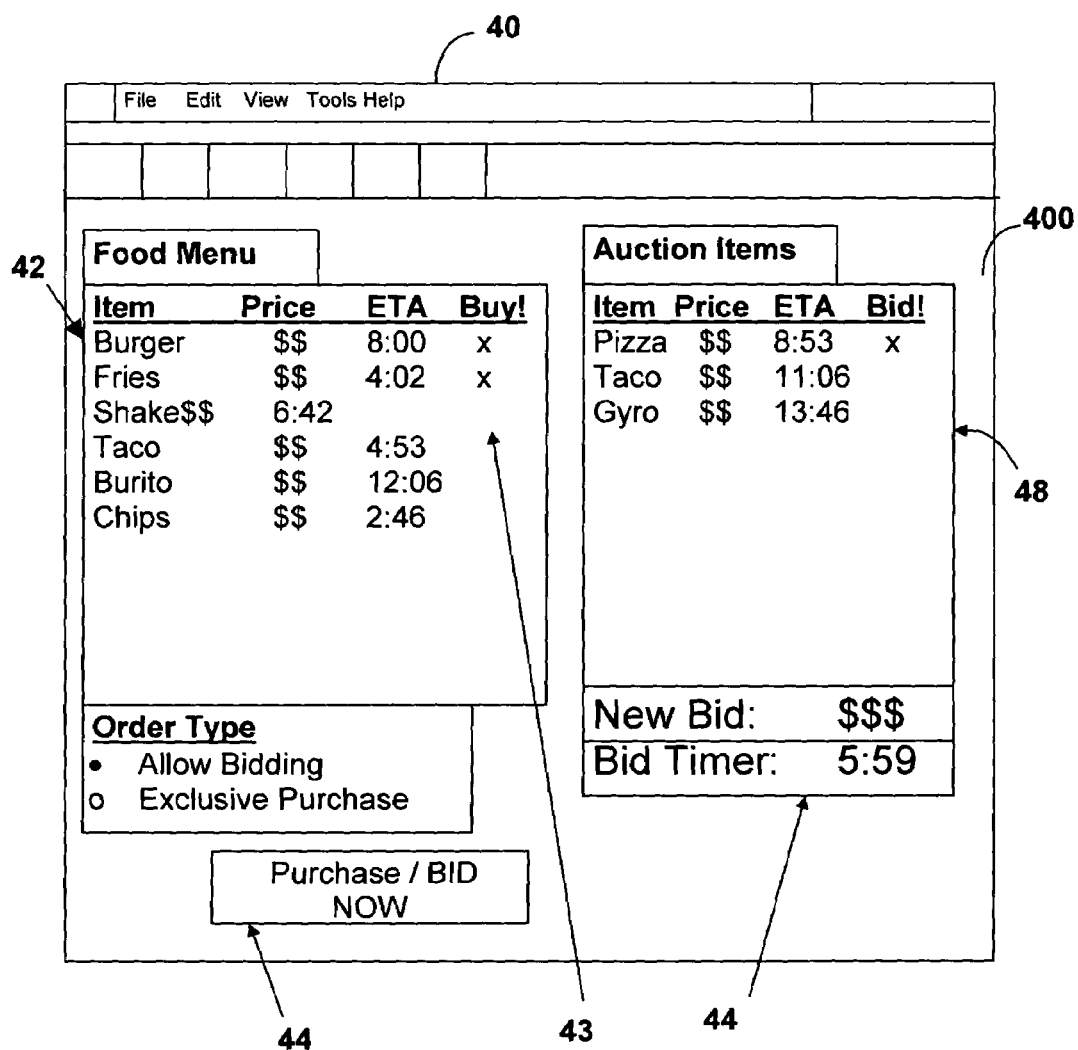
FIG. 4 is a pictorial drawing depicting an Internet browser output displayed on the customer graphic display of FIG. 2, as provided by a networked food sales/auctioning/delivery system in accordance with another embodiment of the invention.

FIG. 4 shows a diagram depicting a browser screen 40 displaying an auction customer page on customer graphic display 231 in accordance with another embodiment of the invention. In general, operation of the user interface and the responses of the system is as described above for a sales browser interface, but a web page 400 may alternatively provide auction capabilities, leading to an entertaining variant on the web purchase scheme outlined above. Customers may choose to purchase items via selection from the dynamic on-line food menu 42 as described above for the purchase-only interface of FIG. 3. Upon placing an order, the customer will have the option to accept or decline the exclusivity of an item bid upon (yielding an ordinary purchase). While price bidding is generally the type of bidding recognized in an auction, another form of bidding may be employed in the methods of the present invention: delivery time or queue placement bidding. When auctioning prepared food items, the supply of such items can be regarded as quasi-infinite and therefore, bidding customers may bid on delivery time/queue placement rather than the actual food item. The distinction between item bidding and queue placement bidding is that the food item is not surrendered in queue placement bidding, only delayed in delivery. In a practical sense, as preparation time forms part of the total time for delivery, even in queue placement bidding the actual food item may be surrendered. However, an exact replacement item is automatically queued for delivery to a losing queue placement bidder, albeit after the queued delivery time for the winning bidder.

In addition to dynamic on-line food menu 42, server 20 provides an additional bid-list 48 of all non-exclusive pending food item orders with details of their status, price and estimated time for delivery. Under certain circumstances bid-list 48 may contain items that were prepared but their delivery was canceled, or other items that are prepared and available. Bid-list 48 allows a second customer to offer a higher price for the item already being prepared. If this price margin is acceptable to a pre-defined price bid structure stored in database 29, a bidding war process is started wherein the original customer is contacted by server and the original customer is informed that the customer's food order (or portion thereof) is being bid against. Server 20 will calculate and provide current bid parameters to each of the interested customers, checking bid increases against database 29 for acceptable bid parameters. Database 29 may contain a static list of bid parameters, such as minimum increase in bid to change delivery cycle, or may contain a dynamically changing list of bid parameters maintained by a stored set of rules whereby bid price options are determined based on inputs from any client and new parameters of a bidder.

In the event of a bidding war, a bid timer 44 will be initialized, activated and displayed by server 20 on each participant's graphical display. Server 20 manages bid timer 44 in coordination with the estimated time of arrival calculations for all bidders. Slack time calculation may be provided by determining the difference between preparation time and delivery time for a mobile provider, but generally slack time is a more complex function based on queued deliveries, queued preparation times and re-route burdens incurred for each bidder. When no slack time is present in the delivery sequence, the server ends the bidding process and awards the winner with the food item order and a new estimated time of arrival. Otherwise, bid timer 44 may be reset at each change of circumstance, such as when a new winning bidder slack time is greater. In addition, server 20 communicates with the unsuccessful bidder(s) and may offer them alternative choices in the form of updated dynamic on-line food menu 42 and updated bid-list 48. Server 20 may also offer a discount on items subsequently re-ordered by an unsuccessful bidder.

As in the purchase-only example, the scheduling of the two events: preparation and delivery is preferably a sophisticated process that takes into account: routing efficiencies for deliveries, variable preparation times of food items, potential as-prepared shelf life of food items, payment incentives for faster delivery and further includes the bidding history and any changes to the delivery point occurring during the bidding and re-bidding process.

While the above-described example provides a mechanism for decision making (via bid timer 44) that is advantageous in avoiding bidding process interference with delivery routes, it is possible to implement the bidding and routing process in different manners, some requiring timer 44 and some not. For example, bidding could be allowed up until the point of actual delivery and transfer of the food items. Such a mechanism would lead to unstable routing during a bidding war, but could be stabilized or at least made cost-efficient by server 20 adding a bid increment that corresponds to at least the cost of re-routing of delivery. As delivery approached on a winning bid, the incremental cost to outbid (due to re-routing) would increase, until the cost became prohibitive for actual food purchase and entered the realm of competitive gaming. With the bid increment, the organization and drivers could be rewarded for participation in re-bidding and re-routing of deliveries, yielding an environment that should be acceptable to the drivers as well as the customers.

It should be noted in the above example, that bidders closer to a fixed supplier would be advantaged over bidders farther away. An adjustment may be introduced to compensate for the differences in delivery distances, or the differences may be left in place, as in the purchase example above, so that the costs of delivery are integrated into the eventual prices developed by the bidding process.

Figure 5A:
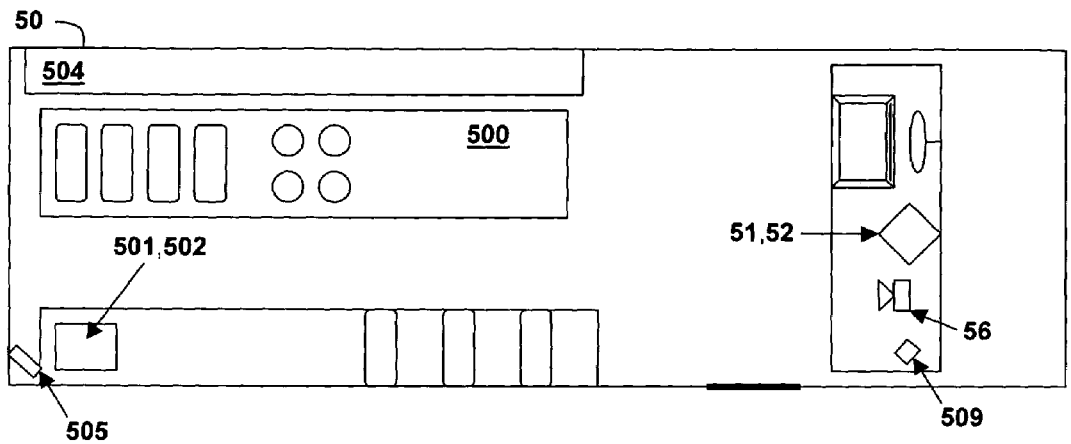
FIG. 5A is a pictorial drawing depicting a top inside view of a delivery/preparation vehicle in accordance with an embodiment of the invention.
Figure 5B:
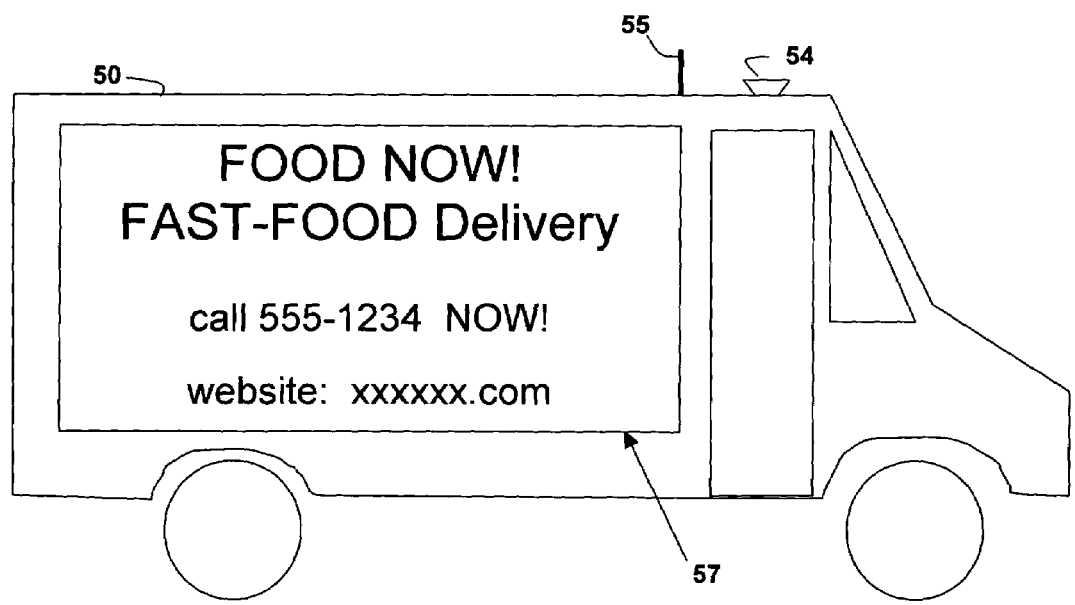
FIG. 5B is a pictorial drawing depicting a side view of a delivery/preparation vehicle in accordance with an embodiment of the invention.

FIGS. 5A and 5B show a delivery vehicle 50 in and with which an embodiment of the present invention is practiced. Delivery vehicle 50 may be a car or truck with or without food preparation capability. Vehicle 50 contains mobile laptop/palmtop computer 51 serving as driver computer 25 of FIG. 2 attached to a graphical display 52 displaying a driver browser page. Delivery vehicle 50 also includes a GPS position location receiver 54, connected to driver computer 51. Computer 51 is remotely connected to the Internet via WLAN interface 55, which may be a cellular data link, WLAN connection or other proprietary RF interface. As depicted in FIG. 5B, delivery vehicle 50 may self-advertise or advertise for others via signage 57. Delivery vehicle 50 may also include camera 509 to provide video or still images of the locale around delivery vehicle 50 to server 20, which can relay the images to clients.

Driver display 52 displays a customized Driver web page from server 20. The driver, usually an employee, will be required to log in for the duration of the employee shift. When logged in as a driver type client, server 20 will receive position location information generated by GPS receiver 54 and update database 29 on a periodic basis, providing tracking of delivery vehicle 50.

The driver of vehicle 50 receives a dynamic list of delivery tasks from server 20 that appearing on graphical display 52, based on current order and delivery status information. Other information such as the order number and end customer information may also be displayed. Server 20 may also provide: detailed driving directions in either text-on-screen or via spoken audio prompts, mapping display showing current position and destination, and up to date road conditions.

The driver web page displayed on graphical display 52 is dynamically updated by server 20, and provides an additional audible alarm or spoken audio prompt, via computer 51 and attached audio device 56 to alert the driver of a destination change.

Delivery vehicle 50 may optionally contain food preparation facilities and/or food warmers for transportation. If delivery vehicle 50 carries food preparation facilities 500, delivery vehicle will also carry an additional mobile laptop/palmtop computer 501 with graphical interface 502 displaying a supplier is web page interface. Computer 501 is connected to the Internet by wireless link 55 and communicates with server 20 as a supplier client. Delivery vehicle 50 also includes food storage area 504 that may be used for: storage/warming of prepared food for delivery, storage of ingredients for food items prepared within delivery vehicle 50, and storage of supplies picked up for delivery between a fixed supplier and a retail fast food location.

The supplier web page, communicating with the server 20 over the Internet via the supplier computer 501 and a browser executing thereon, is required to be logged in to server 20 during while that supplier is available to provide food items for sale. The supplier may be a franchise in a fixed location, or the supplier may be transported in a stocked mobile delivery vehicle 50 having food preparation facilities 500. When logged in as a supplier type of client, server 20 presents to supplier a list of what food items to prepare next to the food preparation facility, as displayed on graphic display 502. Server 20 supplies an order number and customer information corresponding to the current order.

The supplier interface appearing on graphic display 502 may be customized to display and allow user input in specific pre-arranged configuration. This input and display configuration could mimic the particular supplier's existing order system, and to the employee it would appear as another Point-of-Sale terminal for fixed retail locations acting as suppliers. Supplier display 501 displays a list of which food item to prepare next, and allows the supplier to communicate to server 20 that the present order has been filled. Server 20 responds by removing the present item from the list of items to prepare and updating the list of food items to prepare. Server 20 also recalculates delivery routings as necessary, and if the prepared item is not yet queued on the driver task list, the item is queued at that time. A camera 505 is located in the back of vehicle 50 for providing video or still images of the food preparation process to server 20, which can relay that information to any of the clients.

The supervisor web pages, generally provided to a supervisor at a fixed location such as fast food retail establishment 14, permit access to all other client levels, but are restricted as between supervisors. Such a system provides individual franchise isolation for information security purposes, and will also permit supporting multiple franchising organizations within a single system or server 20, without compromising information that should only be available to a particular franchisee or franchising organization.

Figure 6:
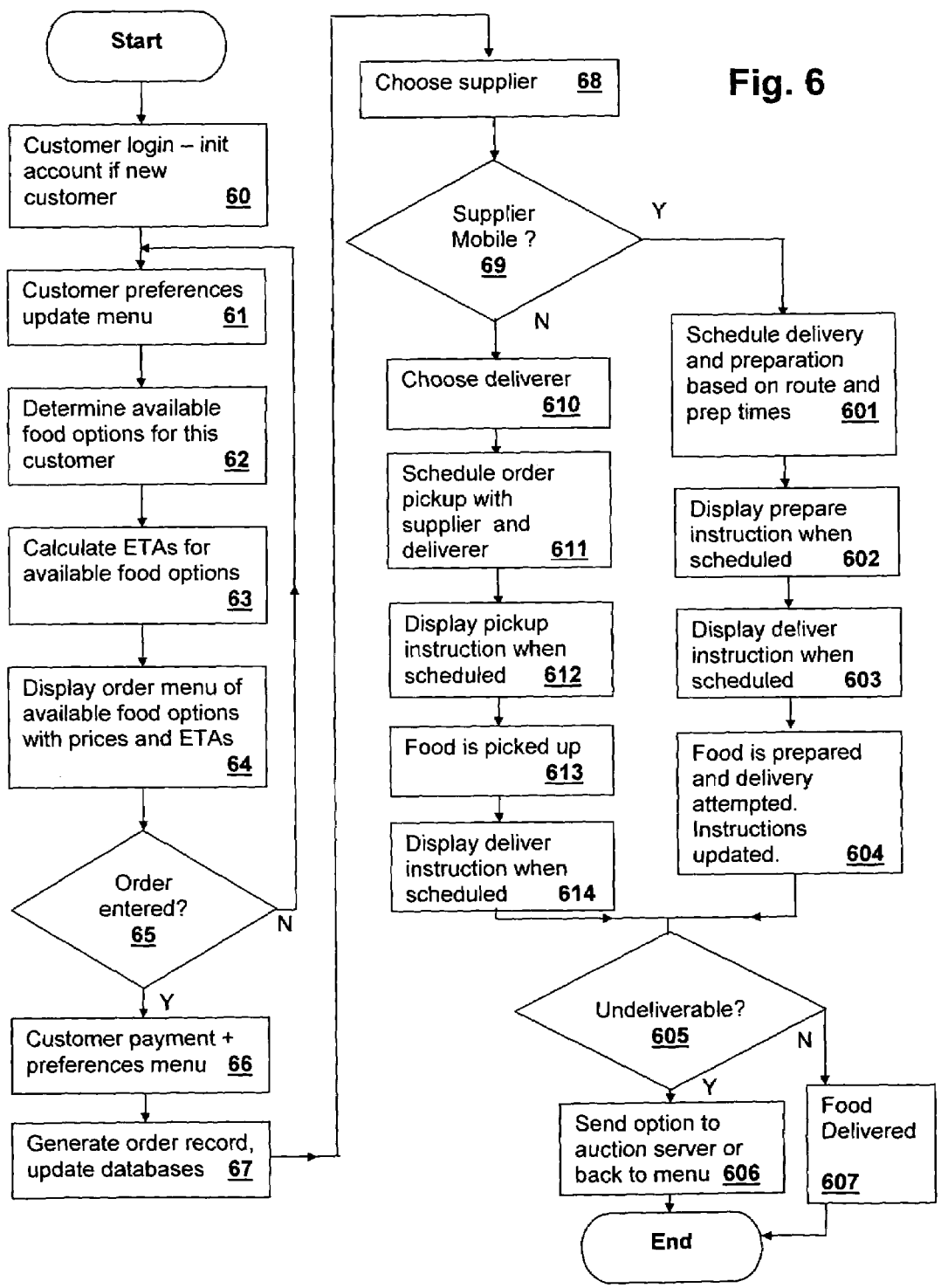
FIG. 6 is a flowchart depicting operation of a networked sales and delivery system in accordance with an embodiment of the invention.

Referring now to FIG. 6, a method in accordance with an embodiment of the invention is depicted in a flowchart. When a customer logs in, a new account is created if the customer is new, otherwise database information is accessed for that user (step 60). The customer is provided an opportunity to update preferences (step 61) via an initial screen or a link. Server 20 then determines available food item options for the customer (step 62) and calculates ETAs for each item (step 63). Next, an order menu of available food items along with prices and ETAs is displayed (step 64), so that the customer may elect to purchase food items for delivery.

If an order is entered by the customer (decision 65), then a customer payment and payment preferences screen or window is displayed (step 66), otherwise steps 61-65 are repeated in order to provide a dynamically updated food item options menu and provide customers the opportunity to update their preferences. After the order is complete, an order record is generated and databases are updated (step 67) and then a supplier is chosen if more than one supplier for that item is available (step 68). If more than one item is available, an efficiency optimization algorithm, such as a time or route minimizer is used to elect the supplier that can meet the ETA provided in step 64 for the purchased food item(s). If the supplier is not mobile (decision 69), then a deliverer is selected via another optimization algorithm (step 610). Alternatively, the supplier and deliverer are chosen in combination in step 68.

For a fixed-location supplier, the order pickup is scheduled for the supplier and deliverer (step 611), preparation is queued at the supplier and pickup is queued for the deliverer. When pickup is next in queue, the driving pickup instruction is displayed (step 612) and the food is picked up when the deliverer arrives at the supplier (step 613). When the delivery is next in queue, the delivery instruction is displayed (step 614) and if the food is deliverable (decision 605) the food is delivered (step 607). If the food is undeliverable (decision 605), then the food item may be placed on auction server or alternatively placed back on purchase food item menus while the food item shelf-life is still valid (step 606). Food items may be undeliverable if the delivery address is false or not locatable, the delivery is refused, or other circumstances cause the food item not to be delivered.

For a mobile supplier, preparation and delivery are queued at the supplier and deliverer based on route and preparation times (step 601). When preparation is next in queue, the preparation instruction is displayed (step 602) and when delivery is next in queue, the deliver instruction is displayed (step 603). Food is prepared and delivered according to the instructions and the instruction queues are updated (step 604). If the food is deliverable (decision 605) the food is delivered (step 607). If the food is undeliverable (decision 605), then the food item may be placed on auction server or alternatively placed back on purchase food item menus while the food item shelf-life is still valid (step 606). While the limited shelf-life life of typical prepared fast food items is short, many Internet events can take place in the time it takes to prepare and deliver, for example, a pizza. With the density of urban living, the likelihood that an undeliverable pizza would be purchased by a nearby destination, especially when offered at a low price and possibly push-advertised to local clients or provided via a notification background applet.

Figure 7:
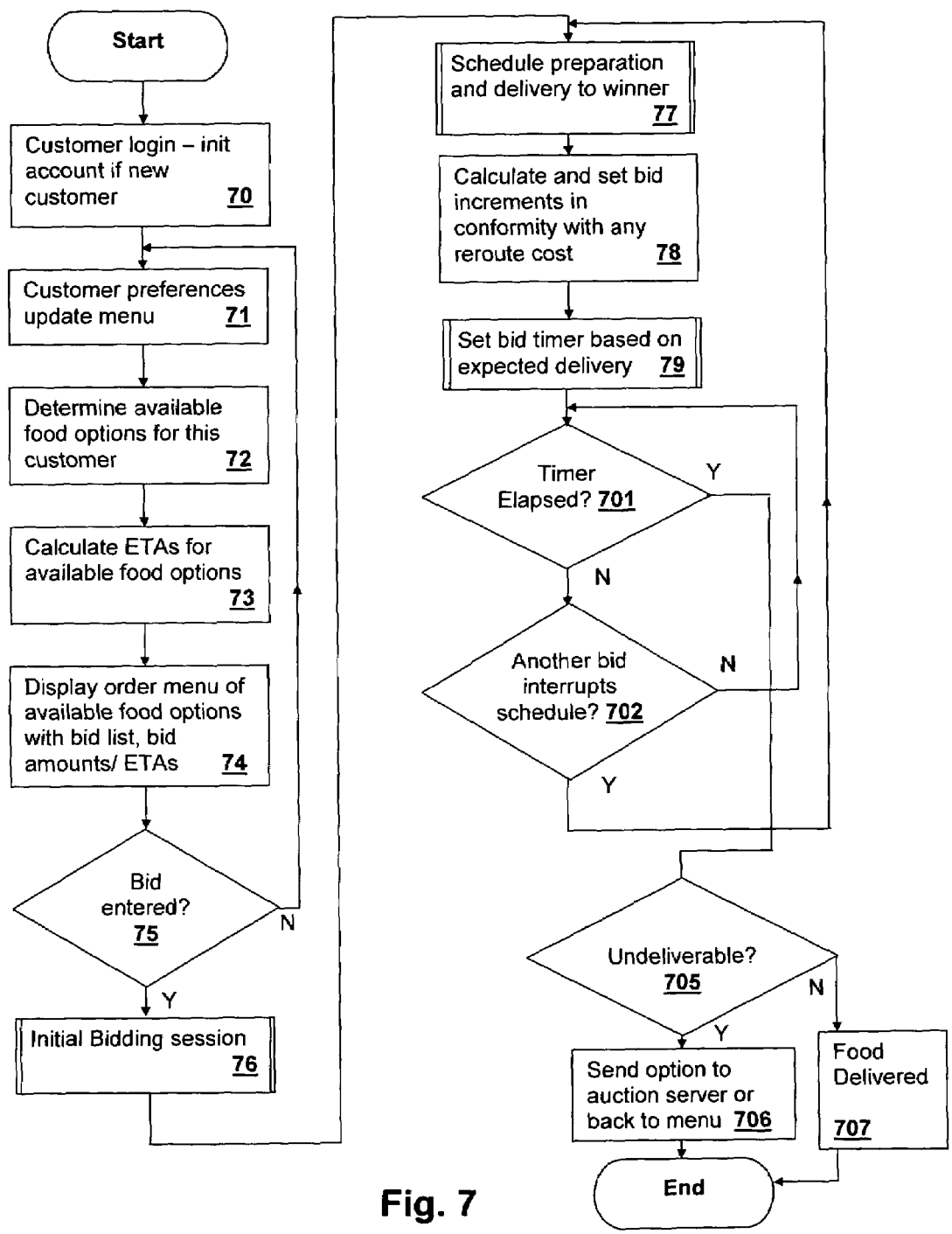
FIG. 7 is a flowchart depicting operation of a networked food sales/auctioning/delivery system in accordance with another embodiment of the invention.

Referring now to FIG. 7, a method in accordance with another embodiment of the invention is depicted in a flowchart. The method of FIG. 7 adds auction functionality to the on-line prepared food sales and ordering system. As in the method illustrated by FIG. 6, when a customer logs in, a new account is created if the customer is new, otherwise database information is accessed for that user (step 700). The customer is provided an opportunity to update preferences (step 701) via an initial screen or a link. Server 20 then determines available food item options for the customer (step 702) and calculates ETAs for each item (step 703). Next, an order menu of available food items along with prices and ETAs is displayed (step 704), so that the customer may elect to purchase food items for delivery. Additionally, a bid list is built and displayed for food items that have already been purchased, but were purchased with an understanding that the purchased items were available for bidding. The above variation can be implemented as either an initial purchase or an initial bid, the difference being that in a bidding scenario, the customer dictates the amount of the initial offering and the sale can be refused if the bid is too low. In general, the first "purchase" in the method if FIG. 7 will in fact be an initial bid. The purchasing system of FIG. 6 should not overlap sales with the auctioning system of FIG. 7, unless specifically provided for in understanding with the customers, as "sales" are distinct in nature from "auctions" and different laws of sales contracts apply to each.

If a bid is entered by the customer (decision 75), then an initial bidding session is initiated (step 76), otherwise steps 71-75 are repeated in order to provide a dynamically updated food item options menu, bid list and provide customers the opportunity to update their preferences. After initial bidding is complete, which may be set via a timer, or may terminate when a minimum bid is reached, an order record is generated, databases are updated a supplier is chosen and preparation and delivery are scheduled for the winner (step 77). Bid increments are set for prospective re-auction bidders based on the rerouting cost (step 78) and a bid timer is set based on expected delivery time (step 79). Until the timer elapses (decision 701), other bids may interrupt the scheduled delivery (decision 702) and if another bidder outbids the prior top bidder during this re-auction process, steps 77-79 and 701 are repeated until the timer indicates that the delivery is completely committed to the present winner (due to the time to re-schedule and reroute, delivery is generally made when the driver is closer to the present bidder than a subsequent higher bidder). However, incentive such as high bid increments may make it practical to permit interruption of the delivery process at any point up to an actual delivery. Payment is generally made at delivery in the auction system or may function as in the method illustrated in FIG. 6, with or without actual posting of charges to a credit card, electronic account, smart card, or other payment means. The delivery scheduling of step 77 generally follows that of FIG. 6 from step 68 onward. When the bid timer has expired, if a food item is undeliverable (step 705), then an option on the item may be sent back to the auction server or placed on a sales menu (step 706) until the practical shelf-life is expired. If the food is deliverable (decision 705) then it is delivered (step 707). Payment is collected at this point for delivery point of payment systems or non-posted server payments. Otherwise, if payments are posted and no delivery is made due to outbidding, etc. credit can be made to the account(s) of the loser(s).

Additionally, a replacement food item may be offered to losing bidders, with a price that may differ for a variety of reasons. The price may be higher, reflecting a higher demand for the food item in the delivery locale, or the price may be set lower as an incentive to get the losing bidder to purchase the replacement food item. Such replacement items may be offered for exclusive sale or may be subject to subsequent re-auction.

Figure 8:
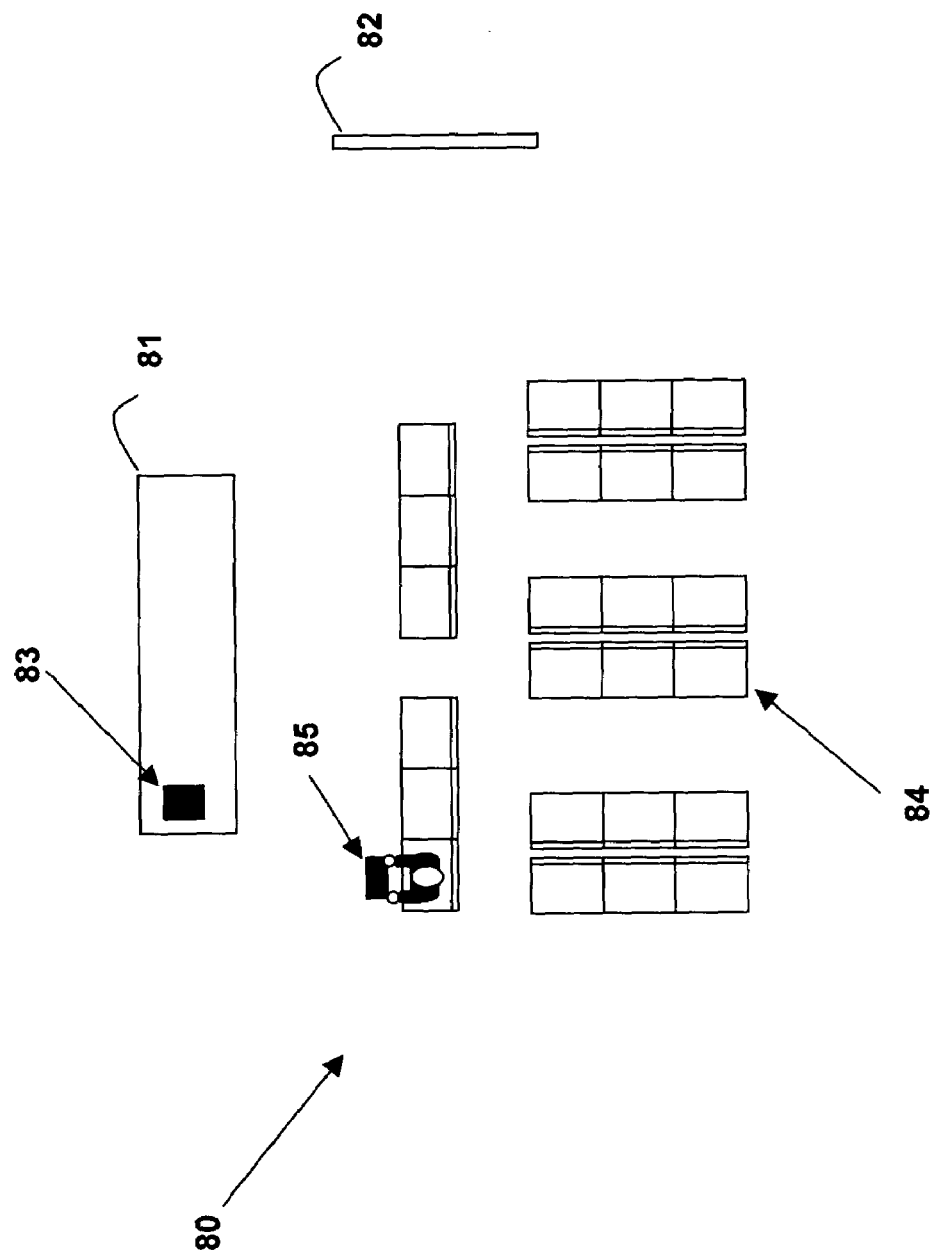
FIG. 8 is a pictorial drawing depicting a system in accordance with yet another embodiment of the invention as may be employed in airline terminals.

Referring now to FIG. 8, a system in accordance with yet another embodiment of the invention as may be employed in airline terminals is depicted. Within the air travel industry, meals are typically tied to seating, with preferable meals provided to first-class passengers. Often, extra first class seats are available that are currently used to provide upgrades to coach passengers or business class passengers. The prepared food that is then given or sold to these passengers as part of the upgrade of seating. However, it is possible to sell or auction the meals associated with the extra first class seats, or extra first class meals that will be available on an aircraft by a system in accordance with an embodiment of the present invention.

As depicted, an air terminal waiting area 80 includes seating 84 a gate counter 81 having a computer terminal 83 and a large display for showing flight status 82. A passenger using a notebook computer 85 may be interfaced to the system via a wireless network connection. The above-described systems and methods may be modified to auction or sell first class meals, either along with the first class seating, or to be delivered to a passenger's existing seat. While consumption of a first class meal in the coach or business seating area might break an established protocol, such dining could serve as a valuable marketing tool for first class tickets, as other coach passengers might be desirous of the level of food and the associated level of attention provided by the service personnel while delivering the meal.

The system depicted uses either the passenger's notebook computers 85 as the customer interface to the system depicted in FIG. 2, or the flight status display 82 may be also used to alert passengers without computers as to sales or auction availability of first class meals with or without accompanying seats. The supplier and deliverer (driver) interfaces are generally merged into a screen and provided by an on-board computer that manages the assignment of meals to passengers, including instructions to deliver first class meals to other sections when appropriate.

Figure 9:
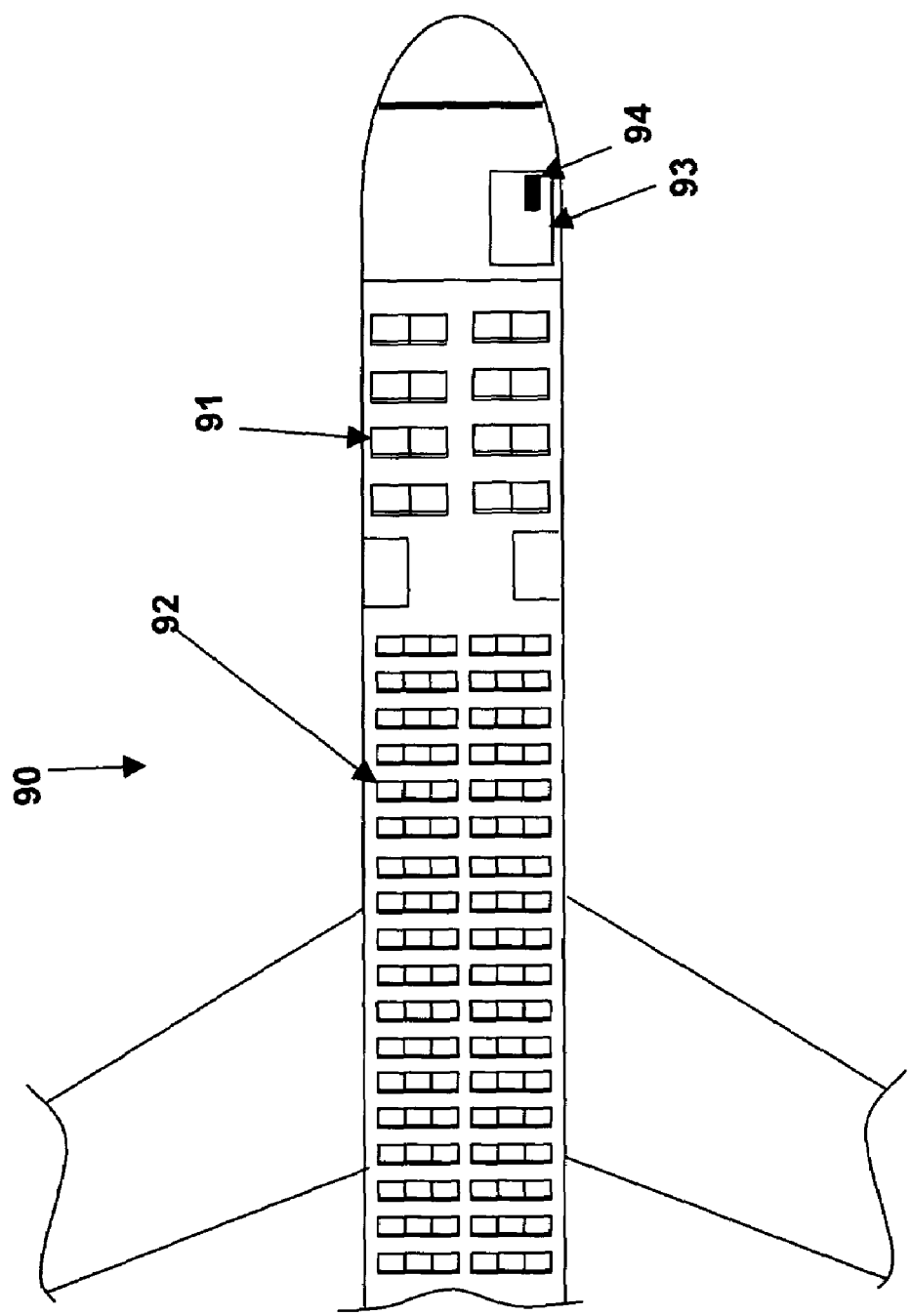
FIG. 9 is a pictorial drawing depicting a system in accordance with yet another embodiment of the invention as may be employed in aircraft.

Referring now to FIG. 9, a system in accordance with yet another embodiment of the invention as may be employed in aircraft is depicted. The system of FIG. 8 may be used in conjunction with the system of FIG. 9 and also supplies a supplier/deliverer computer interface 94 in a food storage/preparation/delivery cart area 93 from which meals are deployed to a coach section 92 and a first class section 91. Seats in each section may include computer interfaces having a display on the back of each seat (or the bulkhead for front seats) and an input device that may serve as an on-board customer interface to continue the sales or bidding process that was provided by the system of FIG. 8 or to initiate a new sales or bidding process on the aircraft. Such a system could be used by passengers to either obtain meals with or without associated seats. Notebook computers in the possession of passengers such as notebook computer 85 could be used on the aircraft if the radiated emissions are permitted and do not interfere with the operation of the aircraft.

Further, passengers could have a provided interface that lets passengers auction first class/business class meals or seats to other passengers. Tracking regulations would be met by ensuring that the computer system driving the auction kept records of the seat reassignments.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for delivering a prepared food item to one of multiple customers, the method comprising:

first determining geographical locations of multiple users of a network, wherein the first determining determines a first geographical location of a first customer and a second geographical location of a second customer;

offering a prepared food item for bid by displaying offers on devices coupled to the network to the multiple customers in conformity with the determined geographical locations;

first receiving a first bid for the prepared food item from a first customer over the network;

scheduling delivery of the prepared food item to the first customer at the first geographical location in response to receiving the first bid second receiving a second bid for the prepared food item from a second customer;

while the delivery is in transit to the first customer, re-scheduling the delivery of the prepared food item to the second customer at the second geographical location in response to receiving the second bid; and wherein the first receiving receives the first bid, the second receiving receives the second bid, and wherein the method further comprises second determining whether or not the second bid is a currently winning bid, and wherein the re-scheduling is performed only in response to the second bid being a currently winning bid.

2. The method of claim 1, wherein the offering displays a first estimated time of arrival for the prepared food item to the first customer as part of a first offer, and wherein the offering displays a second estimated time of arrival to the second customer as part of a second offer.

3. The method of claim 1, further comprising:

delivering the prepared food item to the second customer; and offering a replacement prepared food item to the first customer to replace the prepared food item delivered to the second customer.

4. The method of claim 1, further comprising:

setting a bid timer that ends a bidding process on expiration; and third determining whether or not the bid timer has expired, and wherein the re-scheduling is performed further in response to the third determining having determined that the bid timer has not expired, whereby the rescheduling is prevented after expiration of the bid timer.

5. The method of claim 4, further comprising first computing a first slack time for preparation and delivery of the prepared food item to the first customer, and wherein the setting sets the bid timer to a value determined in conformity with the first slack time.

6. The method of claim 5, further comprising:

second computing a second slack time in preparation and delivery of the prepared food item to the second customer if the second bid exceeds the first bid and the bid timer has not expired; and resetting the bid timer in conformity with the second slack time.

7. The method of claim 1, further comprising determining a bid increment in conformity with a second geographical location of the second customer, wherein the second determining further determines whether or not the second bid exceeds the first bid by the bid increment, to determine whether or not the second bid is a currently winning bid.

8. The method of claim 1, wherein the first receiving receives the first purchase request, the second receiving receives the second purchase request, and wherein the method further comprises automatically scheduling delivery of a replacement food item for delivering to the first customer in response to the re-scheduling.

9. The method of claim 1, further comprising preparing the prepared food item within a vehicle that delivers the prepared food item.

10. The method of claim 9, further comprising transmitting a video image of the preparing within the vehicle to the first customer over the network.

11. The method of claim 1, wherein the geographical locations are seats on an aircraft, wherein the prepared food item is a food item provided for consumption on the aircraft, and wherein the first customer and the second customer are passengers on the aircraft.

12. A system for scheduling delivery of a prepared food item to one of multiple customers and including at least one server coupled via an electronic network to client devices having displays for displaying offers of the prepared food item to customers, wherein the at least one server comprises a processor for executing program instructions and a memory for storing the program instructions, and wherein the program instructions comprise program instructions for:
 first determining geographical locations of multiple users of a network, wherein the program instructions for first determining determine a first geographical location of a first customer and a second geographical location of a second customer;
 offering a prepared food item for bid by displaying offers on devices coupled to the network to the multiple customers in conformity with the determined geographical locations;
 first receiving a first bid for the prepared food item from a first customer over the network;
 scheduling delivery of the prepared food item to the first customer at the first geographical location in response to receiving the first bid;
 second receiving a second bid for the prepared food item from a second customer;
 while the delivery is in transit to the first customer, re-scheduling the delivery of the prepared food item to the second customer at the second geographical location in response to receiving the second bid; and
 wherein the first receiving receives the first bid, the second receiving receives the second bid, and wherein the method further comprises second determining whether or not the second bid is a currently winning bid, and wherein the re-scheduling is performed only in response to the second bid being a currently winning bid.

13. The system of claim 12, wherein the program instructions for offering transmit a first estimated time of arrival for the prepared food item to the first customer as part of a first offer, and wherein the program instructions offering further transmit a second estimated time of arrival to the second customer as part of a second offer.

14. The system of claim 13, further comprising program instructions for determining a bid increment in conformity with a second geographical location of the second customer, wherein the program instructions for second determining further determine whether or not the second bid exceeds the first bid by the bid increment, to determine whether or not the second bid is a currently winning bid.

15. The system of claim 12, wherein the program instructions further comprise program instructions for offering a replacement prepared food item to the first customer to replace the prepared food item re-scheduled for delivery to the second customer.

16. The system of claim 12, wherein the program instructions further comprise program instructions for:
 setting a bid timer that ends a bidding process on expiration; and
 third determining whether or not the bid timer has expired, and wherein the program instructions for re-scheduling are executed further in response to the program instructions for third determining having determined that the bid timer has not expired, whereby the program instructions for rescheduling are not executed after expiration of the bid timer.

17. The system of claim 16, further comprising program instructions for first computing a first slack time for preparation and delivery of the prepared food item to the first customer, and wherein the program instructions for setting set the bid timer to a value determined in conformity with the first slack time.

18. The system of claim 17, further comprising program instructions for:
 second computing a second slack time in preparation and delivery of the prepared food item to the second customer if the second bid exceeds the first bid and the bid timer has not expired; and
 resetting the bid timer in conformity with the second slack time.

19. The system of claim 12, wherein the program instructions for first receiving receive the first purchase request, the program instructions for second receiving receive the second purchase request, and wherein the program instructions further comprise program instructions for automatically scheduling delivery of a replacement food item for delivering to the first customer in response to the re-scheduling.

20. The system of claim 12, further comprising program instructions for transmitting a video image of preparation of the prepared food item within a vehicle to the first customer.

21. The system of claim 12, wherein the geographical locations are seats on an aircraft, wherein the prepared food item is a food item provided for consumption on the aircraft, and wherein the first customer and the second customer are passengers on the aircraft.

22. A computer program product comprising program instructions embedded on a memory for storing the program instructions for execution on at least one server coupled to an electronic network, wherein the program instructions are for scheduling delivery of a prepared food item to one of multiple customers, wherein the at least one server comprises a processor for executing program instructions and a memory for storing the program instructions, and wherein the program instructions comprise program instructions for:
 first determining geographical locations of multiple users of a network, wherein the program instructions for first determining determine a first geographical location of a first customer and a second geographical location of a second customer;
 offering a prepared food item for bid by transmitting offers to client devices coupled to the network to the multiple customers in conformity with the determined geographical locations;
 first receiving a first bid for the prepared food item from a first customer over the network;
 scheduling delivery of the prepared food item to the first customer at the first geographical location in response to receiving the first bid;
 second receiving a second bid for the prepared food item from a second customer;
 while the delivery is in transit to the first customer, re-scheduling the delivery of the prepared food item to the second customer at the second geographical location in response to receiving the second bid; and wherein the first receiving receives the first bid, the second receiving receives the second bid, and wherein the method further comprises second determining whether or not the second bid is a currently winning bid, and wherein the re-scheduling is performed only in response to the second bid being a currently winning bid.

* * * * *